United States Patent [19]
Berdut

[11] Patent Number: 5,615,618
[45] Date of Patent: Apr. 1, 1997

[54] ORBITAL AND MODULAR MOTORS USING PERMANENT MAGNETS AND INTERLEAVED IRON OR STEEL MAGNETICALLY PERMEABLE MEMBERS

[76] Inventor: Elberto Berdut, Orquidea No. 98, Santa Maria, Guaynabo, Puerto Rico, 00926

[21] Appl. No.: 419,946

[22] Filed: Apr. 11, 1995

Related U.S. Application Data

[63] Continuation-in-part of Ser. No. 184,440, Jan. 21, 1994, Pat. No. 5,452,663, which is a continuation-in-part of Ser. No. 45,863, Apr. 14, 1993, Pat. No. 5,431,109.

[51] Int. Cl.$^6$ .................................................. B60L 13/02
[52] U.S. Cl. ....................... 104/290; 104/283; 104/286; 104/294; 310/154
[58] Field of Search ............................. 104/281, 283, 104/284, 286, 290, 292, 294; 318/135; 310/12, 13, 14, 127, 128, 129, 152, 154, 155, 156; 188/267, 284

[56] References Cited

U.S. PATENT DOCUMENTS

| | | | |
|---|---|---|---|
| 2,177,472 | 10/1939 | Barrett | 310/154 |
| 3,791,309 | 2/1974 | Baermann | 104/283 |
| 3,842,300 | 10/1974 | Daykin et al. | 310/154 |
| 3,885,504 | 5/1975 | Baermann | 104/283 |
| 3,895,585 | 7/1975 | Schwarzler | 104/290 |
| 3,899,979 | 8/1975 | Godsey, Jr. | 104/283 |
| 4,148,260 | 4/1979 | Minovitch | 104/283 |
| 4,151,447 | 4/1979 | von der Heide et al. | 104/290 |
| 4,307,668 | 12/1981 | Vinson | 104/281 |
| 4,641,065 | 2/1987 | Shibuki et al. | 310/13 |
| 4,711,182 | 12/1987 | Alexandrov et al. | 104/283 |
| 4,785,228 | 11/1988 | Goddard | 310/152 |
| 5,072,144 | 12/1991 | Saito et al. | 310/12 |
| 5,165,347 | 11/1992 | Wagner | 104/283 |

OTHER PUBLICATIONS

"Ceramic 5 Magnets—Typical Ceramic 5 Magnetic Material Characteristics", How to Order Sheet.
"General Information—Standard Magnets", pp. 3–6.
"NMI Notes", US. Department of Transportation, Federal Railroad Administration, U.S. Army Corps of Engineers, U.S. Department of Energy, No. 7, Nov. 1992, Maglev.

*Primary Examiner*—S. Joseph Morano
*Attorney, Agent, or Firm*—Ronald P. Kananen

[57] ABSTRACT

A rotating device such as an orbital motor has a stator which includes a pair of opposed, generally annular magnetic units each comprising a plurality of groups of permanent magnets such as ceramic or ferrous magnets arranged in a side-by-side relationship, each plurality being separated from an adjacent plurality by a magnetically permeable member, such as a malleable steel member or a malleable or molded iron member, to focus the lines of magnetic flux. A core armature is rotatably secured to a rotable shaft between the opposed pair of generally annular magnetic units for rotation therebetween. A commutator is fixedly secured for rotation with the armature coil and for receiving power supplied to or received from the motor and input electrical terminals. Preferably, each magnetic unit forms an annulus made from a plurality of arc-shaped permanent magnets, each having an inner face, an outer face separated from the inner face defining the axially-directed thickness of the magnet, an inner radial surface, and an outer radial surface separated from the inner radial surface defining the radially-directed thickness of the magnet. Each magnet also includes a pair of arcuately-displaced ends joining the inner face, the outer face, the inner radial surface, and the outer radial surface. The ends are in contact with intermediate T-shaped magnetically permeable members as described.

13 Claims, 7 Drawing Sheets

ORBITAL AND MODULAR MOTORS USING PERMANENT MAGNETS AND INTERLEAVED IRON OR STEEL MAGNETICALLY PERMEABLE MEMBERS

CROSS-REFERENCE TO RELATED APPLICATIONS

This application is a continuation-in-part of the applicant's prior application, Ser. No. 08/184,440, filed on Jan. 21, 1994, now U.S. Pat. No. 5,452,663, which in turn is a continuation-in-part of Ser. No. 08/045,863, filed on Apr. 14, 1993 now U.S. Pat. No. 5,431,109.

BACKGROUND OF THE INVENTION

This invention relates to a rotating device such as a motor, and particularly to an orbital motor or generator, which uses a plurality of magnetic units, each comprising a plurality of permanent ceramic or ferrous magnets interleaved with magnetically permeable members, such as iron or steel members. More particularly, this invention relates to a rotating electrical device, such as a motor or a generator, using a pair of such magnetic units as stators, and having a rotor therebetween. Still more particularly, this invention relates to such a rotating electrical device having an armature coil and a commutator which includes brushes.

DESCRIPTION OF THE RELEVANT ART

In the U.S. patent to Minovitch, U.S. Pat. No. 4,148,260, a use is disclosed for ceramic ferrite brick magnets placed in an end to end relationship along a steel channel, with a similar opposed grouping, thus to eliminate flux leakage while providing lateral stability and an increased repulsive force. However, in the applicant's prior copending applications, the use of a magnetic unit for levitation is disclosed wherein the magnetic unit comprises a group of at least a pair of permanent magnets comprising either ceramic magnets or ferrous magnets; at least a pair of magnetically permeable members comprising malleable steel members, malleable iron members, or molded iron members, located adjacent each outer surface of said pair of ceramic magnets; and means for securing said pair of magnetically permeable members and said pair of permanent magnets, thus to provide a magnetic unit which concentrates its magnetic flux through the malleable steel members.

The magnetic units as set forth in those prior applications are structured so that the magnetically permeable members located at the outer surfaces of the permanent magnet members are generally L-shaped, and the magnetically permeable member located between a pair of the groups of magnetic members is generally T-shaped.

The system as set forth in those prior copending applications further include a linear motor for assisting propulsion of the train, wherein the linear motor includes a plurality of groups of such magnetic units located in an elongated channel in a support member, the plurality of groups being respectively connected to form a first plurality of brush members along the path for the train with alternating positive and negative magnetic units; a second plurality of brush members on the train for contacting the first plurality of brush members along the path, whereupon travel of the train along the path is assisted by the respective magnetic forces of attraction and repulsion.

In addition, the prior copending applications contemplate a rotatable motor, for assisting movement of a movable member, comprising a plurality of magnetic units each having a plurality of groups of permanent magnets comprising ceramic magnets or ferrous magnets disposed along a path; means interconnecting with the plurality of the magnetic units for forming a plurality of respectively-located positive and magnetic brushes along the path; a plurality of magnetic cores having windings thereabout, disposed on the path, so that alternative forces of attraction and repulsion assist movement of the movable member, the movable member being capable of movement along a rotational path about an axis. The magnetically permeable members are located at the ends of the plurality of permanent magnets, and intermediate the groups of magnets, wherein ends of the magnetically permeable members define the rotational path in which the core travels.

In the linear motor as described, the brushes act as a linear commutator wherein the brushes alternately form a positive magnetic portion, a negative magnetic portion, and an intermediate portion, the brushes on the linear path respectively contacting the portions to successively receive attractive and repulsive forces.

It has, however, continued to be a problem in this art to effectively utilize permanent magnet systems for rotating machines and to provide simple propulsion means for such rotatable systems. It is, nevertheless, a continuing desire to provide such rotating members in a structure which has little energy consumption compared to conventional motors, and wherein maintenance is simple and economical. It is also desired to produce such a rotating piece of machinery in a modular construction to permit relatively same-sized parts to be used in differently-sized motors. It is also desired to provide such a rotating member which uses DC current, but can also work with AC current by using a reciprocal current rectifier.

These and other shortcomings of the prior art and general aims of this invention will become apparent from a review of the detailed description of this invention which follows.

BRIEF SUMMARY OF THE INVENTION

It is an overall object of this invention to provide a magnetic unit suitable for use in an orbital motor, which unit uses permanent magnets, such as ceramic or ferrous magnets.

It is another overall object of this invention to provide such a magnetic unit using a plurality of permanent magnets, such as ceramic or ferrous magnets, individually using a magnetically permeable member, such as malleable steel or malleable or molded iron between the magnets, wherein such magnetic units form opposed stators for an orbital motor.

It is another overall object of this invention to use such magnetic units on opposing portions of a support member for acting as stators for a rotating armature coil having windings thereon for coacting with the enhanced magnetic fields from the magnetic units.

It is still another overall object of this invention to use such magnetic units in an orbital motor having commutators on the fixed portion of a chassis housing the magnetic units and a movable armature core secured between the magnetic units.

A main feature of the invention relates to a rotating device such as an orbital motor having a stator which includes a pair of opposed magnetic units each comprising a plurality of groups of permanent magnets such as ceramic or ferrous magnets arranged in a side-by-side relationship, each plurality being separated from an adjacent plurality by a magnetically permeable member, such as a malleable steel member or a malleable or molded iron member, to focus the lines of magnetic flux. Preferably, each of the ceramic magnets within a group is also separated by an interleaved sheet of malleable steel. Such a plurality of groups of ceramic magnets are secured together and to a supporting chassis member through fastening members, and may be separated from the support by a non-magnetic member, such as a non-ferrous plate.

A core armature is rotatably secured to a rotable shaft between the opposed pair of magnetic units for rotation therebetween. A commutator is fixedly secured for rotation with the armature coil and for receiving power supplied to or received from the motor and input electrical terminals.

Preferably, each magnetic unit forms an annulus made from a plurality of arc-shaped permanent magnets, each having an inner face, an outer face separated from the inner face defining the axially-directed thickness of the magnet, an inner radial surface, and an outer radial surface separated from the inner radial surface defining the radially-directed thickness of the magnet. Each magnet also includes a pair of arcuately-displaced ends joining the inner face, the outer face, the inner radial surface, and the outer radial surface. The ends are in contact with intermediate T-shaped magnetically permeable members as described.

These and other features of the invention will be seen in the detailed description of the invention which follows.

DETAILED DESCRIPTION OF THE PREFERRED EMBODIMENTS

Figure 1:
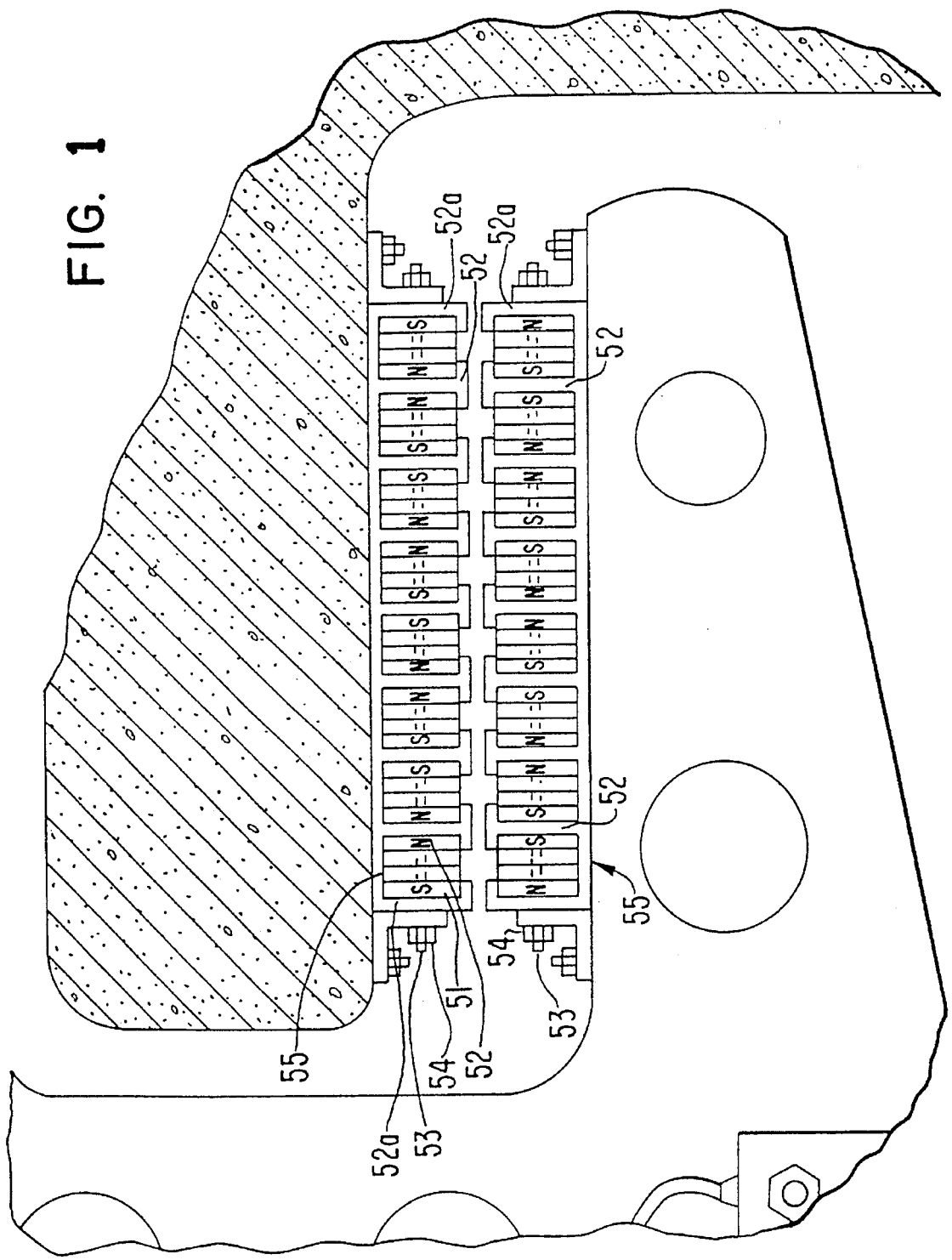
FIG. 1 is a front view, partially in cross section, showing a view of magnetic units according to the applicant's invention, when used in a magnetic levitation system, as shown in the applicant's prior copending applications.
Figure 5:
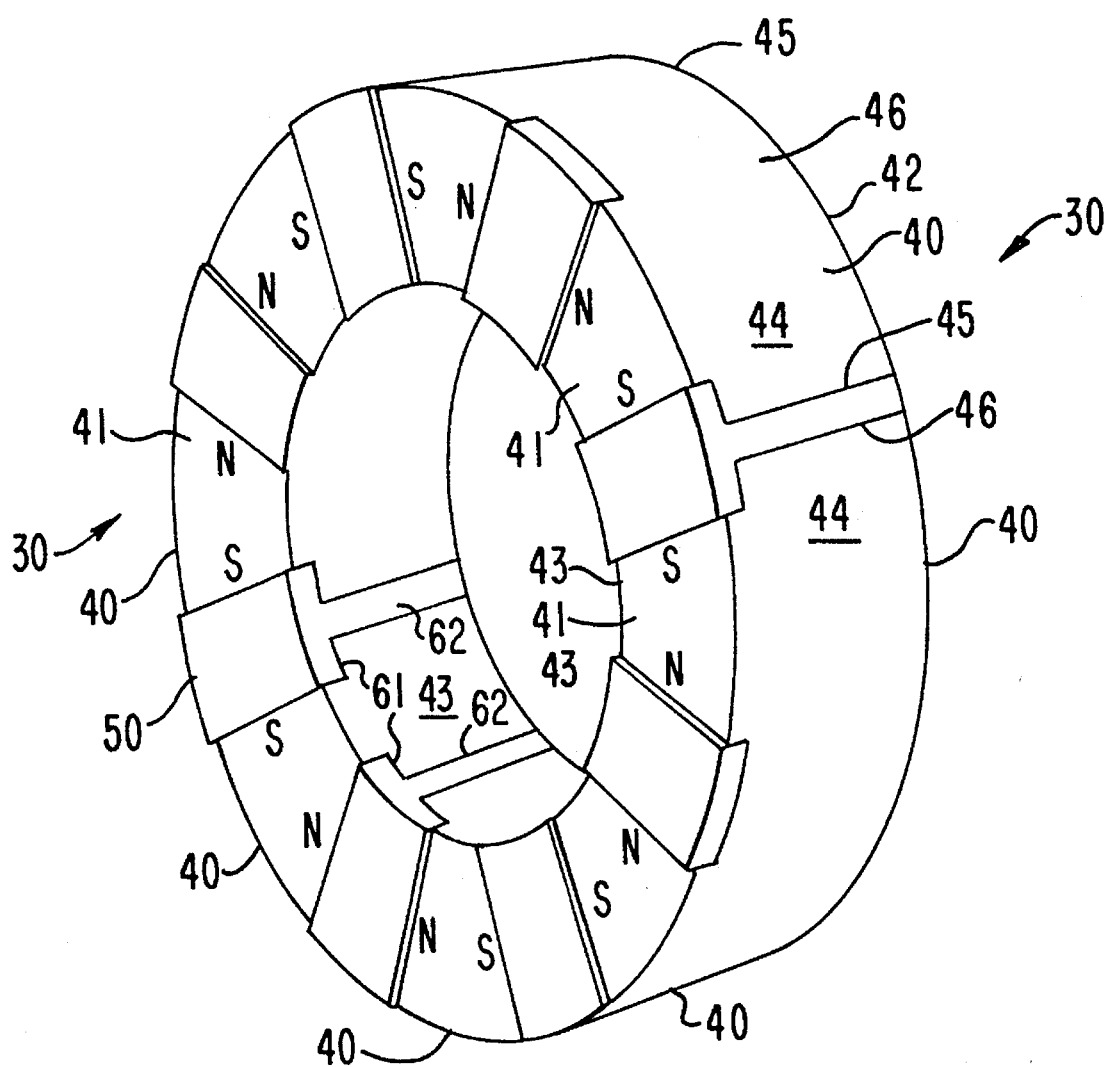
FIG. 5 shows a perspective view of an annular magnetic unit for use in the orbital motor and generator of FIG. 4.

FIG. 1, which corresponds to FIG. 5 of the applicant's parent, copending application, shows in greater detail the construction of each of the magnetic units 25. Each magnetic unit 25 comprises a plurality of bar-shaped permanent magnets 51, such as ceramic or ferrous magnets separated by a plurality of generally T-shaped magnetically permeable members 52, such as malleable steel rails or malleable or molded iron members, wherein the end members 52a are generally L-shaped. A sandwich-like construction unit 55 is formed by alternating an end member 52a, a permanent magnet 51, a magnetically permeable member 52, another permanent magnet 51 or a plurality of such magnets, and so forth. Each of the sandwich-like construction units is secured together as by a non-magnetic bolt 53, secured at its opposing ends by a non-magnetic fastener 54. Preferably, each group of permanent magnets is separated by a magnetically permeable member located between adjacent permanent magnets, and each of a plurality of such groups is separated by a magnetically permeable member, such as malleable steel plate or a malleable or molded (or cast) iron plate.

Ceramic magnets are readily commercially available and are selected for their magnetic strength and physical sizing from commercial sources. At present, ferrous permanent magnets are preferred because of their greater force capabilities. A suitable ferrous permanent magnet developed by Delco-Remy is known as a Magnequench brand permanent magnet and can attain an effective force of 12 to 14 kilogauss compared to ceramic magnets that can develop a force of 7 to 9 kilogauss. In contrast, the invention develops about 100 kilogauss when using the Magnequench brand permanent magnet and the magnetically permeable members.

Figure 2:
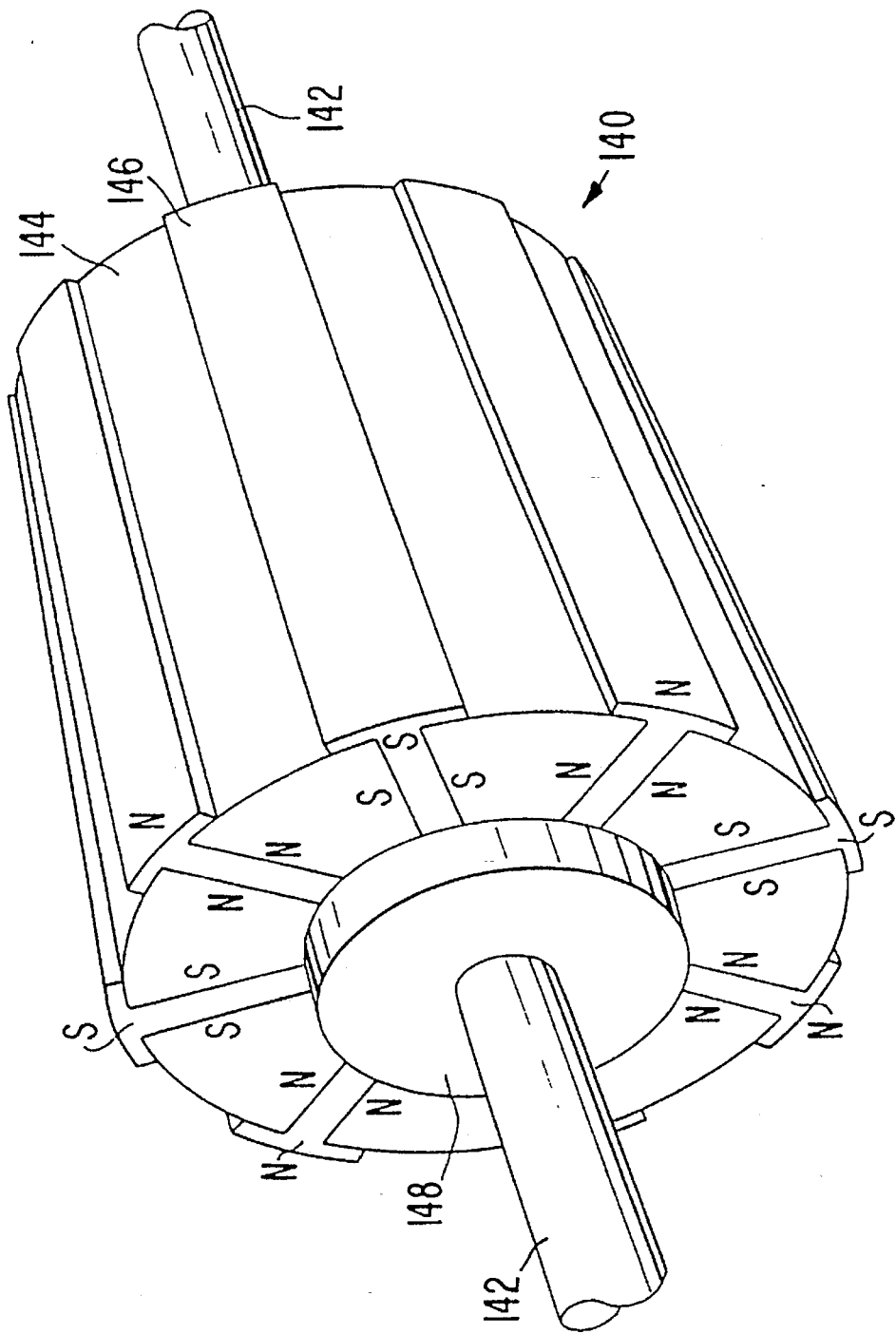
FIG. 2 shows a core rotor for a generator and motor using magnetic units of the type described, as shown in the latter of the applicant's latter-identified copending application.
Figure 3:
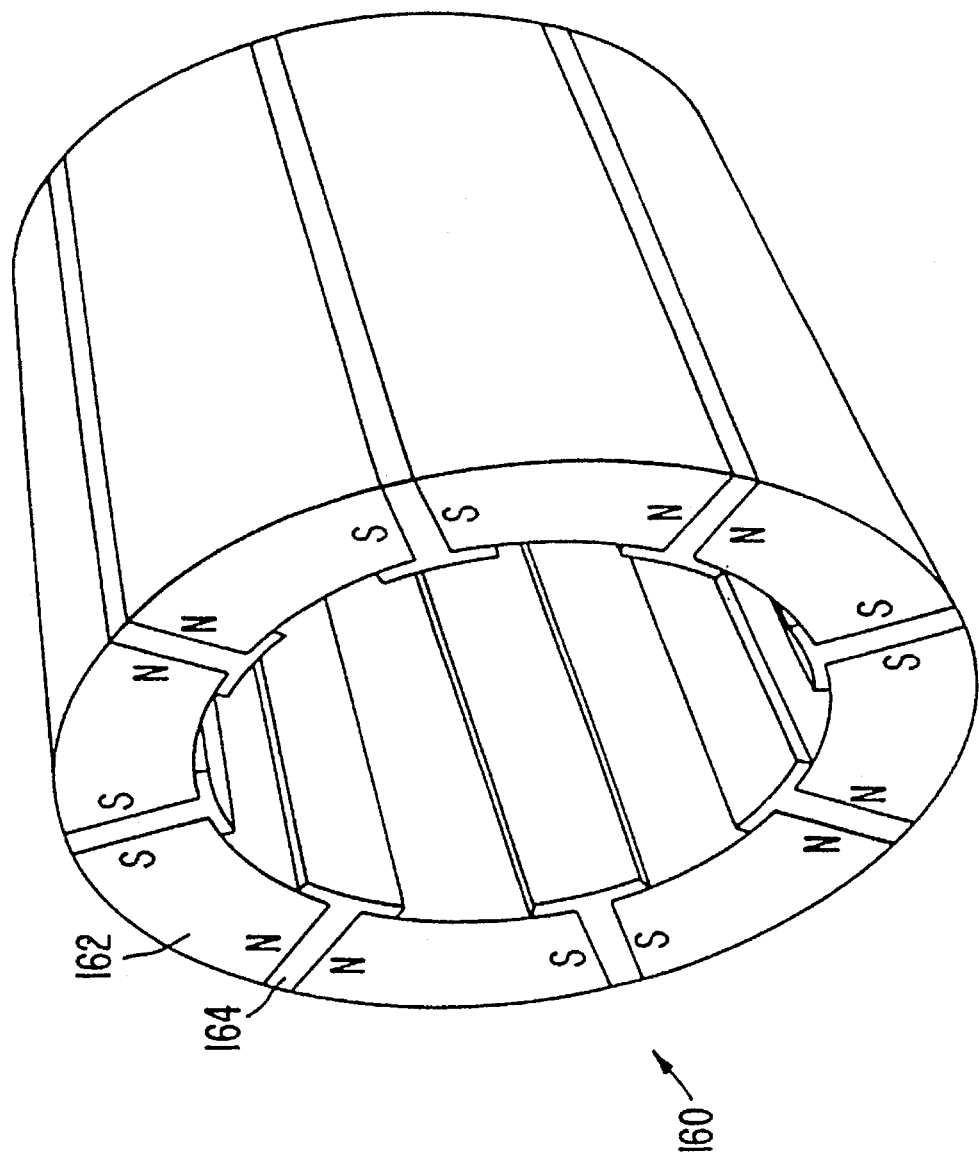
FIG. 3 shows a stator for a generator and motor using magnetic units of the type described and suitable for use with the core rotor of FIG. 2, as shown in the latter of the applicant's latter-identified copending application.
Figure 9:
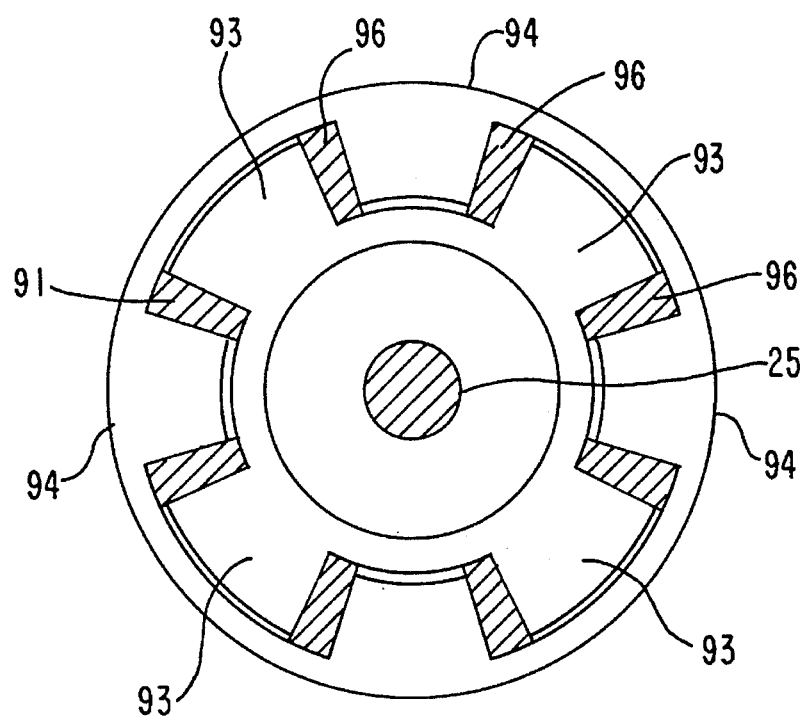
FIG. 9 shows a rotating brush with an irregular contact pattern for alternating forces of attraction when the motor and generator of FIG. 4 is rotating.

FIGS. 2 and 3, which correspond respectively to FIGS. 9 and 10 in the applicant's prior, copending application, show a core rotor 140 and a stator 160 for a rotating device for a generator and motor incorporating the principles of the invention. In FIG. 9, a core rotor 140 is fixedly secured to an axially extending shaft 142 having a plurality of sector-shaped permanent magnet members 144 located about the shaft 142. The members 144 are of the types described in connection with the prior embodiments. The magnets 144 are spaced by magnetically permeable members 146. The members 144 and 146 are secured to the shaft by a suitable end plate 148. It should be noted that adjacent magnetic members 144 are positioned with like magnetic poles adjacent one another facing intermediate magnetically permeable members 146.

The stator 160 of FIG. 10 is similarly constructed of a rotationally spaced plurality of permanent magnetic units 162 of the type described interspersed about interleaved magnetically permeable members 164 of the types previously described. The rotational dynamics of this combination follow the teachings of the prior discussions.

Figure 4:
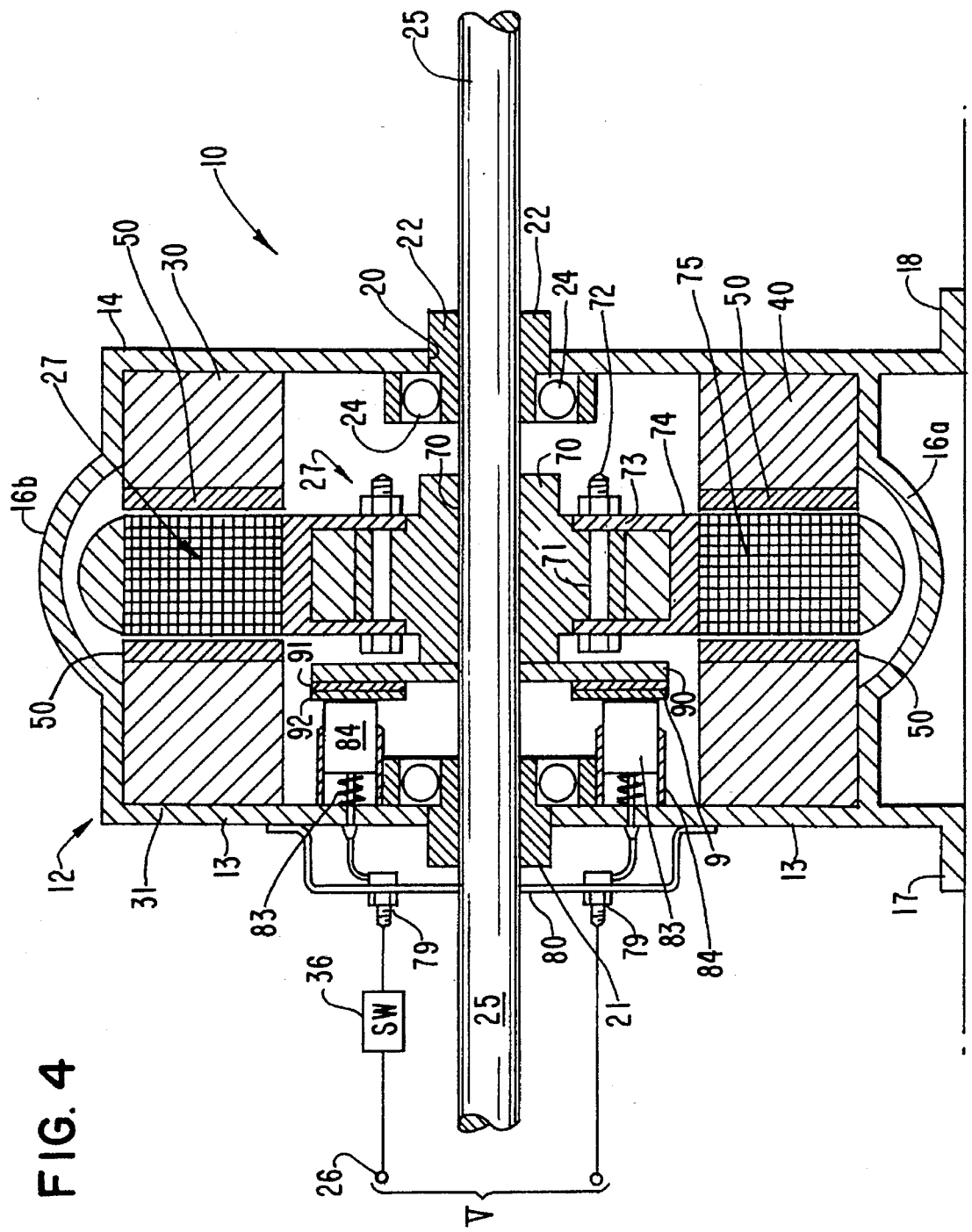
FIG. 4 shows a cross-sectional view of an orbital motor and generator according to the invention of this continuation-in-part application.

FIG. 4 shows a side cross-sectional view of the orbital motor and generator (hereafter, simply "motor") of the invention of this continuation-in-part application, shown generally by the reference numeral 10. The motor 10 includes a chassis 12, having opposing side walls 13,14 and opposing end walls 15,16, each of the latter having a protrusion 16a to accommodate a rotating, center-mounted armature coil within the motor 10. The side walls 13,14 terminate in axially-extending foot members 17, 18 for supporting the chassis 12 and hence the motor 10.

The opposing side walls 13, 14 each have a central opening 19, 20 for receiving ball bearing supports 21, 22, each respectively supporting a ball bearing structure having ball bearings 23, 24 for facilitating rotation of the armature coil 27. An axle 25 is supported for rotation by the ball bearing supports 21, 22 and is fixedly secured for rotation with the center coil 27 acting as a rotatable armature.

Figure 8:
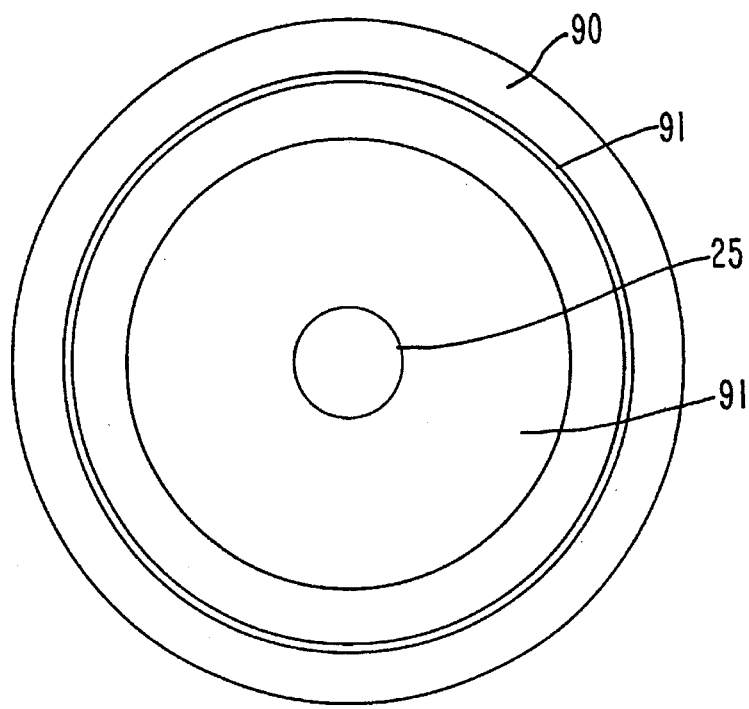
FIG. 8 shows a backing plate for a commutator used in FIG. 4.

The motor 10 includes a pair of opposed generally cylindrical magnetic units 30 (best seen in FIG. 5) and 31 fixedly secured within the motor 10 on the interior of the side walls 13, 14 respectively. The magnetic unit 31 is constructed substantially like the magnetic unit 30 but in the opposite hand so that the units 30, 31 face each other when mounted within the interior of the motor 10. The rotatable armature coil 27 is mounted intermediate the magnetic units 30, 31 for rotation therebetween. A commutator 34, which will be described in greater detail in connection with FIGS. 8 and 9, is fixedly secured for rotation with the armature coil 27. Power is supplied to or received from the motor 10 at the terminals 26, representatively shown as connected through a switch 36.

As seen in FIG. 5, the magnetic unit 30 comprises a plurality of arc-shaped permanent magnets 40. Eight such permanent magnets 40 are shown, but the number can be greater or lesser, paying attention to the structural requirement that the magnets generally form an annulus having a thickness equal to the width of the permanent magnets. Thus, each magnet has an inner face 41, an outer face 42 separated from the inner face 41 defining the axially-directed thickness of the magnet 40, an inner radial surface 43, and an outer radial surface 44 separated from the inner radial surface 43 defining the radially-directed thickness of the magnet 40. The arcuately-displaced ends 45, 46 of each of the permanent magnets 40 complete the structure of each magnet.

The inner face 41 may be notched at its ends 45, 46 to accommodate the intermediate T-shaped magnetically permeable member 50, such as can be made from malleable iron or steel, or cast iron therebetween, as described previously in a planar configuration. In the alternative, a tee portion 60 of the magnet 50 can have its lower surface 61 on the inner surface 41 of the magnet 40. The tee portion 60 is connected to a leg portion 62 which is located and in contact between the opposed arcuate surfaces 45, 46. Each T-shaped member 50 is located intermediate like magnetic poles, arranged in a pattern as follows: STS, NTN, STS, NTN . . . NTN. In operation, the fluxes are concentrated as described in the prior embodiments of the prior copending applications.

Figure 6:
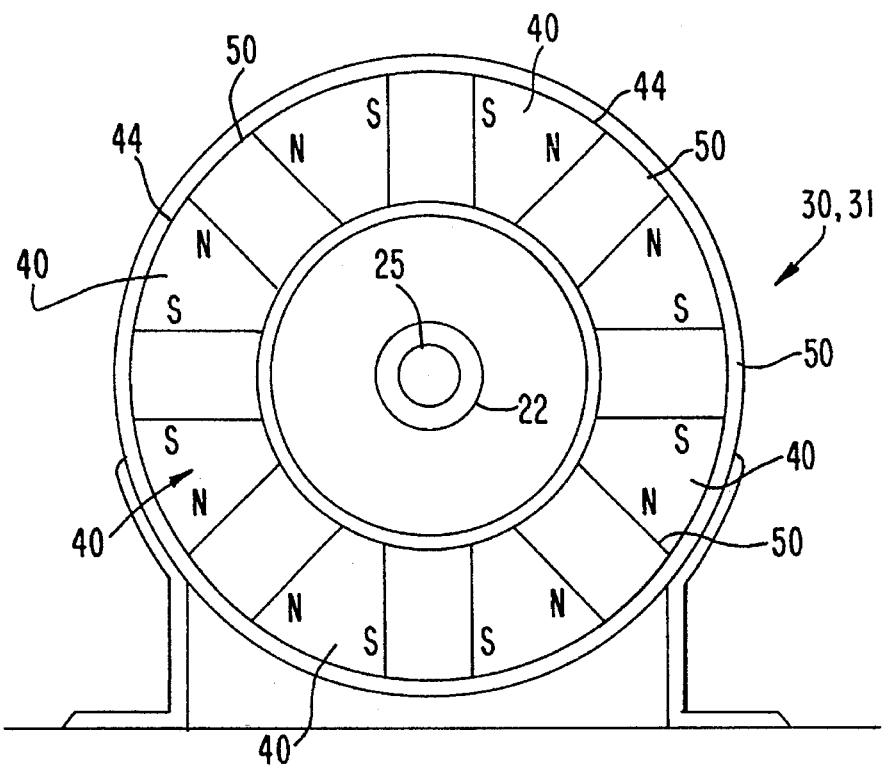
FIG. 6 shows a plan view of the annular magnetic unit of FIG. 5.

A plan view of the unit 30 is shown in FIG. 6, where like reference numerals are used as in FIG. 5.

Figure 7:
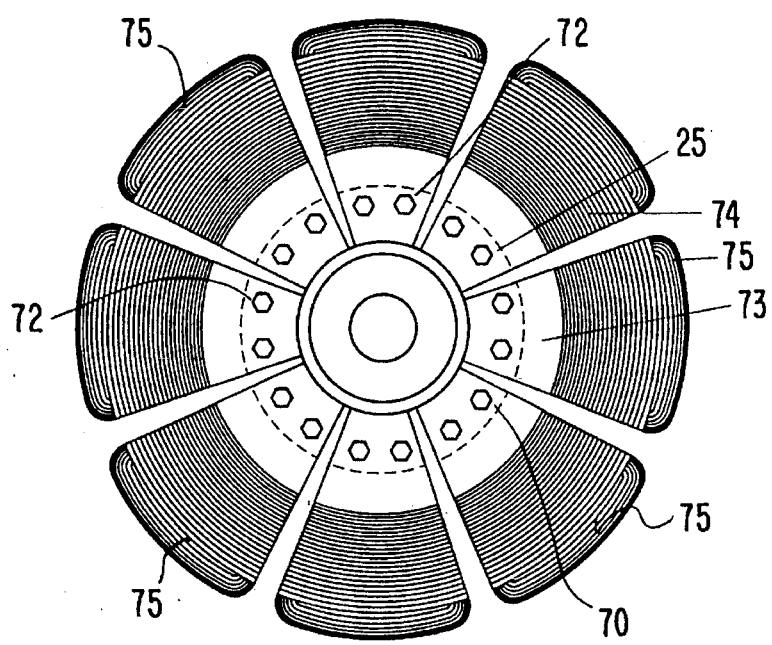
FIG. 7 shows a side view of a rotatable coil used with the orbital motor and generator of FIG. 4.

FIG. 7 shows a side view of the armature coil 27 in greater detail. As seen in FIGS. 4 and 7, the coil 27 includes a centrally-located hub 70 fixedly secured to the axle 25 and defining a bore 71 for receiving a fastener 72 spanning the opposed legs 73 of a U-shaped support member 74 acting as a support for windings 75 about a malleable metal nucleus 76. Preferably, eight sectors of windings are used to correspond to the number of magnets 40 shown in FIG. 5.

Returning to FIG. 4, the voltage applied to the terminals 26 (when operating in a motor mode) or received from the terminals 26 (when operating in a generator mode) is applied to insulated terminals 79 on the connector member 80. The terminals are in electrical circuit with brushes 82 which are biased by springs 83 for axial movement in brush holders 84, respectively. The brush holders 84 are secured to the interior of the casing side wall 31.

The contacting surfaces of the brushes 82 engage the commutator 34 which comprises a circular plate 90 (see FIG. 9) fixedly secured to the axle 25. An electrically insulating layer 91 insulates an irregularly-shaped conductor 92 to define periods of conduction and non-conduction when the commutator 34 is rotating. The commutator 34 thus includes two circular pieces 93, 94 of a perforated conductor, preferably copper separated respectively by an insulating section 96 in a pattern which is repeated about the circumference of the commutator. Thus, as the commutator 34 rotates, the axially-extending contact surfaces of the brushes 82 respectively engage and disengage the conductive areas 93,94. With a DC voltage applied to the terminals 35 to initiate rotation, the interrelationship between the coils 74 and the permanent magnets 40 as intensified by the T-shaped members 50 causes the armature to rotate. If an AC voltage is applied, it is preferable to use a rectifier to apply a DC voltage to the terminals 35.

The number of armatures can be increased with a corresponding increase in the number of permanent magnet structures 30 as previously described. Thus, the available force of the motor shown in FIG. 4 can be effectively doubled, or tripled, or increased even further.

The number of permanent magnetic fields can also be repeated two times, or four times, or more.

The velocity of the orbital motor 10 as described can be regulated by the voltage and by the position of the brushes that can be regulated mechanically or automatically. With the structure shown, the location of the winding 75 is remote from the axle 25 so that the center of the thrust zone of the motor is a maximally displaced from the axle.

What is claimed is:

1. A rotating electrical device, comprising:

first and second coaxially arranged annular magnetic units, each magnetic unit comprising:

a plurality of permanent magnets comprising either ceramic magnets or ferrous magnets; and a plurality of magnetically permeable members comprising malleable steel members, malleable iron members, or molded iron members, located between adjacent opposed surfaces of the plurality of permanent magnets, the plurality of magnetically permeable members being arranged to concentrate magnetic flux in a space between said first and second magnetic units;

a rotatable axle which is coaxial with said first and second annular magnetic units; and an armature coil supported on said axle for rotation between opposed radially extending faces of said first and said second magnetic units, said armature coil being disposed in the space between said first and second magnetic units in which magnetic flux is concentrated by the plurality of magnetically permeable members so that sides of said armature coil are exposed to the magnetic flux from the plurality of magnetically permeable members of said first and second magnetic units.

2. A rotating electrical device as set forth in claim 1, wherein the permeable members are each a malleable steel member and are located between said permanent magnets.

3. A rotating electrical device as set forth in claim 1, further including a non-magnetic member which is located adjacent a surface of each of said first and second magnetic units for securing said first and second magnetic units and which form part of a chassis of the rotating device.

4. A rotating electrical device as set forth in claim 1, further including a third permanent magnet, and a third magnetically permeable member located between the third permanent magnet and one of said plurality of permanent magnets.

5. A rotating electrical device as set forth in claim 4, wherein each of said magnetically permeable members is generally T-shaped.

6. A rotating electrical device as set forth in claim 4, wherein said first and second magnetic units act as first and second stators.

7. A rotating electrical device as set forth in claim 6, further including a commutator having a brush in contact with a commutator plate secured to said axle.

8. A rotating electrical device as set forth in claim 7, wherein said commutator includes a pair of irregularly-shaped conductive elements for alternatively contacting said brush as said commutator rotates with said axle.

9. A rotating electrical device as set forth in claim 1, wherein the first and second magnetically permeable members are T-shaped and are arranged with the plurality of permanent magnets so that a leg portion of the T-shape is sandwiched between adjacent permanent magnets and so that a top portion of the T-shape is arranged to extend along a radial side surface of each of the adjacent permanent magnets and to face into the space between the first and second magnetic units into which the magnetic flux is concentrated.

10. An orbital motor comprising:
- a stator which includes a pair of opposed generally annular magnetic units each comprising a plurality of permanent magnets comprising ceramic or ferrous magnets arranged in a side-by-side relationship, each permanent magnet being separated from an adjacent permanent magnet by a magnetically permeable member, comprising a malleable steel member or a malleable or molded iron member, to focus the lines of magnetic flux into a space between the opposed generally annular magnetic units;
- a core armature secured to a rotatable shaft, said core armature being disposed in the space between the opposed pair of generally annular magnetic units so as to be exposed to the lines of magnetic flux focussed in the space and for rotation between the opposed generally annular magnetic units; and
- a commutator fixedly secured for rotation with the armature coil for transferring power between the armature coil and input electrical terminals.

11. An orbital motor as set forth in claim 10, wherein each generally annular magnetic unit forms an annulus and wherein the permanent magnets are each arc-shaped, each having an inner face, an outer face separated from the inner face defining the axially-directed thickness of the magnet, an inner radial surface, and an outer radial surface separated from the inner radial surface defining the radially-directed thickness of the magnet.

12. An orbital motor as set forth in claim 11, wherein each of the permanent magnets also includes a pair of arcuately-displaced ends joining the inner face, the outer face, the inner radial surface, and the outer radial surface, the ends being in contact with T-shaped magnetically permeable members.

13. A rotating electrical device as set forth in claim 10, wherein the magnetically permeable member is T-shaped and is arranged with the plurality of permanent magnets so that a leg portion of the T-shape is sandwiched between adjacent permanent magnets and so that a top portion of the T-shape is arranged to extend along a radial side surface of each of the adjacent permanent magnets and to face into the space between the first and second magnetic units into which the magnetic flux is focussed.

* * * * *